(12) United States Patent
Frost et al.

(10) Patent No.: US 9,137,875 B2
(45) Date of Patent: Sep. 15, 2015

(54) METHOD FOR OPERATING AT LEAST ONE LIGHT-EMITTING DIODE AND LIGHTING DEVICE FOR CARRYING OUT THE METHOD

(75) Inventors: Tobias Frost, Burglengenfeld (DE); Stefan Lorenz, Obertraubling (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 13/818,372

(22) PCT Filed: Aug. 2, 2011

(86) PCT No.: PCT/EP2011/063298
§ 371 (c)(1),
(2), (4) Date: Feb. 22, 2013

(87) PCT Pub. No.: WO2012/025345
PCT Pub. Date: Mar. 1, 2012

(65) Prior Publication Data
US 2013/0147388 A1    Jun. 13, 2013

(30) Foreign Application Priority Data
Aug. 26, 2010  (DE) .................. 10 2010 039 827

(51) Int. Cl.
*H05B 37/02* (2006.01)
*H05B 33/08* (2006.01)

(52) U.S. Cl.
CPC ............ *H05B 37/02* (2013.01); *H05B 33/0818* (2013.01); *H05B 33/0845* (2013.01)

(58) Field of Classification Search
USPC .......... 315/250, 291, 294, 297, 312, 308, 307
See application file for complete search history.

(56) References Cited

U.S. PATENT DOCUMENTS

| | | | |
|---|---|---|---|
| 7,258,463 B2 | 8/2007 | Sloan et al. | |
| 8,074,085 B2 | 12/2011 | Lehmann | |
| 2003/0057888 A1* | 3/2003 | Archenhold et al. | ......... 315/291 |
| 2003/0214242 A1 | 11/2003 | Berg-johansen | |
| 2005/0128743 A1 | 6/2005 | Chuey et al. | |
| 2009/0303161 A1 | 12/2009 | Messmer et al. | |
| 2010/0148703 A1* | 6/2010 | Mizuno | ......................... 315/312 |
| 2010/0164399 A1* | 7/2010 | Radermacher et al. | ....... 315/294 |

FOREIGN PATENT DOCUMENTS

| | | |
|---|---|---|
| DE | 102004001862 B3 | 9/2005 |
| DE | 102004044001 A1 | 4/2006 |
| DE | 10349553 B4 | 4/2007 |
| DE | 19848925 B4 | 4/2010 |
| EP | 0625843 A1 | 11/1994 |

(Continued)

OTHER PUBLICATIONS

English language abstract of DE 198 48 925 B4 dated Apr. 27, 2000.
English language abstract of DE 103 49 553 B4 dated Jan. 20, 2005.
(Continued)

*Primary Examiner* — Douglas W Owens
*Assistant Examiner* — Jonathan Cooper

(57) ABSTRACT

In a method for operating at least one light emitting diode the at least one light emitting diode is operated at least in some ranges by means of a pulse number modulation, in which a number of uniform current pulses is set within a predetermined interval duration depending on a light energy desired value.

19 Claims, 4 Drawing Sheets

(56) References Cited

FOREIGN PATENT DOCUMENTS

| EP | 1689212 | A1 | 9/2006 |
| EP | 2015285 | A2 | 1/2009 |

OTHER PUBLICATIONS

English language abstract of DE 10 2004 001 862 B3 dated Sep. 15, 2005.
European office action for application No. 11773206.5.

* cited by examiner

METHOD FOR OPERATING AT LEAST ONE LIGHT-EMITTING DIODE AND LIGHTING DEVICE FOR CARRYING OUT THE METHOD

RELATED APPLICATIONS

The present application is a national stage entry according to 35 U.S.C. §371 of PCT application No. PCT/EP2011/063298 filed on Aug. 2, 2011, which claims priority from German application No. 10 2010 039 827.6 filed on Aug. 26, 2010. cl TECHNICAL FIELD Various embodiments relate to a method for operating or feeding at least one light emitting diode. Furthermore, various embodiments relate to a lighting device including at least one light emitting diode and at least one driver for feeding the at least one light emitting diode.

BACKGROUND

In order to regulate the brightness of light emitting diodes (LEDs) over a wide range, variation of the LED current operating the LEDs (current level modulation) is unsuitable since, at low and high currents, the brightness of the LEDs can deviate from a linear current/brightness ratio that is otherwise readily fulfilled, and the LEDs can, moreover, be damaged. Therefore, LEDs are usually operated by means of a pulse width modulation (PWM), in which the LEDs are operated with a constant current I for a predetermined switched-on duration t1 (also designated as switched-on time) and thereafter are switched to be currentless for a predetermined switched-off duration t2 (also designated as switched-off time). A duty ratio t1/T having a period duration T=(t1+t2) in this case corresponds approximately to a desired dimming level. If the period duration T=(t1+t2) is chosen to be too long (typically longer than 10 ms), this PWM dimming method can be perceived by a human observer by virtue of flicker. The current intensity or the current I, integrated over the switched-on duration t1, defines the light energy or quantity of light generated in the period T.

PWM driving or the PWM dimming method makes dynamic demands of a current source used. In the ideal case, a constant current is made available for the switched-on duration t1, and no current flows during the switched-off duration t2 (that is to say that the switch-over process is carried out negligibly fast). Only then is the duty ratio t1/(t1+t2) directly proportional to an effective brightness or intensity of the LED(s). In the case of current sources having a high rise time constant t_PSU (that is to say that duration required by the current source to raise its current value from the switched-off state to a predefined proportion of the nominal value) and low dimming levels, this is no longer ensured, however, such that the dimming behavior then deviates from the linear behavior.

In the case of (color) mixing of light from different-colored LEDs with different required intensity ratios or individual switched-on durations (e.g. t1$i$ for i different LEDs), in order to be able to set a certain cumulative color locus, it is important to keep the intensity ratio or brightness ratio between the different LEDs at a specific value. In the case of an excessively low dimming level (ratio of the present current intensity to a maximum current intensity), the brightness ratio e.g. between two different-colored LEDs is no longer proportional to t1$a$/t1$b$, however, and the effective mixed color changes appreciably.

Consequently, the minimum dimming level usable in practice has hitherto essentially been defined by the rise time constant t_PSU or the speed of the current source and the period duration T. In practice, therefore, period durations T of approximately 0.1 ms are not undershot, which disadvantageously limits the dimming level. The dimming by means of the pulse width modulation is consequently used, in particular, for period durations T in a range of 10 ms>T>0.1 ms. Flicker is no longer perceptible for such period durations T.

One possibility for tackling these disadvantages is to use fast current sources, but the latter are comparatively expensive. It is also possible to accept flicker at low dimming levels and/or color deviations at low dimming levels, but this is deemed to be disadvantageous by a user.

SUMMARY

Various embodiments at least partly eliminate the disadvantages in the prior art and in particular improve a luminous behavior of at least one light emitting diode for low dimming levels, in particular linearize it to a greater extent.

Various embodiments provide a method for operating at least one light emitting diode, wherein the at least one light emitting diode is operated at least in some ranges by means of a pulse number modulation, in which a number of uniform current pulses is set within a predetermined interval duration depending on a desired value for the light energy to be emitted by at least one light emitting diode ("light energy desired value"), in particular a dimming level. Thus, in other words, the number of current pulses can be variable depending on the wanted light energy desired value, and the desired value can be approximated, in particular, by the number producing a smallest deviation.

The novel pulse number modulation makes it possible, in a simple manner, to improve in particular a linearity between the set light energy desired value and an actual value actually attained, namely in particular for low dimming levels. In this case, the pulse number modulation benefits from the fact that, on account of the uniformity of the current pulses, the light energy generated per current pulse by the at least one light emitting diode is well known, namely even without knowing the shape of the current pulses. In other words, the dimming level is variable with a stepped nature in a precisely defined manner and enables a greatly reduced non-linearity. In particular, a relative error between the light energy desired value, in particular a desired dimming level, and an associated light energy actual value, e.g. the actual dimming level, can be considerably reduced. A stepped nature and a residual non-linearity can be set in a simple manner by means of a level or a switched-on duration of the current pulses. The pulse number modulation can also be used with slow current sources.

The dimming level can be regarded, in particular, as a proportional light energy value, current value and/or proportional brightness value in relation to a maximum current value for feeding the at least one light emitting diode and/or brightness value of the light emitted by the at least one light emitting diode. However, the light energy desired value can also include some other parameter, e.g. an electrical power.

In one configuration, the method includes switching over between a pulse width modulation (in which, in particular, a switched-on duration of a current pulse is set depending on a wanted dimming level), in particular at relatively high dimming levels or toward relatively high dimming levels, and the pulse number modulation, in particular at relatively low dimming levels or toward relatively low dimming levels. The operating mode can thereby be adapted individually to different operating ranges of the light emitting diode, in particular to different dimming ranges. The use of the pulse width modulation for relatively high dimming levels, e.g. of 10% or more, makes possible there particularly simple driving or feeding of the at least one light source, namely through to an undimmed state.

In particular, it is possible to switch over between the pulse width modulation and the pulse number modulation such that the pulse width modulation and the pulse number modulation attain at least approximately an identical light intensity, light energy, brightness or the like and/or an identical accuracy at an associated switch-over point.

In another configuration, the switching over is carried out if a dimming level is attained or exceeded which corresponds to a smallest switched-on duration of the current pulse of the pulse width modulation for which the current pulse attains its nominal current. The pulse width modulation can thus be used, in particular, above this dimming level, and the pulse number modulation below this dimming level. This makes use of the fact that a linearity between the desired dimming level and the actual dimming level in the case of the pulse width modulation deteriorates considerably if the nominal current of the associated single current pulse is no longer attained, although an absolute deviation becomes smaller. By contrast, it has been found that the use of, in particular, a plurality of comparatively short or small current pulses of the pulse number modulation improves the linearity.

In one configuration, furthermore, a current source for feeding the at least one light emitting diode has a rise time constant which is shorter than the period duration of the pulse width modulation, in particular 0.01 times to 0.1 times shorter. As a result, for a wide range of dimming levels it is possible to use the simple, stepless pulse width modulation with a sufficiently good linearity. The case where the rise time constant is 0.01 times to 0.1 times shorter than the period duration of the pulse width modulation has the advantage that within the period duration a steady state can then be attained after a duration corresponding usually to approximately three rise time constants.

The rise time constant can be, in particular, that duration required by the current source to attain a current value of 0.5 times the nominal current or, preferably, to attain a current value of $(1-1/e)$, correspondingly approximately 0.63 times the nominal current.

In one configuration, furthermore, the method includes switching over between a current level modulation at relatively high dimming levels and the pulse number modulation at relatively low dimming levels. This affords the advantage that the at least one light emitting diode can be operated with dimming levels at which a (continuously applied) current level of a current level modulation would lie below its lower threshold value. This makes use of the fact that, for operation without damage, many light emitting diodes require feeding with a current level having at least the lower threshold value. However, the pulse number modulation can also already be carried out at higher values of the current level or dimming values for which the pulse number modulation enables a better accuracy than the current level modulation.

In one configuration, moreover, a pulse duration or switched-on duration of the at least one current pulse of the pulse number modulation is less than or equal to a rise time constant of a current source for feeding the at least one light emitting diode, e.g. of a driver. With a significantly longer switched-on duration, the number of pulses per interval or period and thus the (discrete) number of dimming levels are considerably restricted.

In another configuration, a switched-on duration of the at least one current pulse of the pulse number modulation is between approximately 0.1 times a rise time constant of a current source for feeding the at least one light emitting diode of the current source and approximately 10 times the rise time constant, in particular between 0.3 times the rise time constant and 1.5 times the rise time constant. With a significantly longer switched-on duration, the number of pulses per interval or period and thus the (discrete) number of dimming levels are considerably restricted. With a significantly shorter switched-on duration or switched-on duration, the switching requires a fast shutter, which can bring about a high outlay and radio-frequency interference radiation.

In yet another configuration, the interval duration is between approximately 1 μs and approximately 10 ms, in particular between approximately 0.5 ms and approximately 10 ms, inclusive of the limit values.

In one configuration, moreover, the switching over is carried out at a switch-over point with a continuous brightness or light energy of the at least one light emitting diode. Consequently, the switching over does not cause a jump in brightness. Thus, the transition between the two types of driving is not noticeable to an observer.

In another configuration, the pulse duration or the switched-on duration of the at least one current pulse of the pulse number modulation is defined on the basis of a number of said at least one current pulse which is fixed at the instant of switching over. In other words, firstly the number of current pulses of the pulse number modulation for switching over can be fixedly predefined and, with knowledge of the number of current pulses, the switched-on duration or pulse duration thereof can be defined such that the transition takes place as continuously as possible. A suitable pulse duration can be determined by means of suitable characteristic curves, for example. Alternatively, the pulse duration can be set by means of a sensor system (e.g. a light sensor) and e.g. a control loop such that the transition takes place as continuously as possible.

In an alternative configuration, in the transition between the pulse width modulation and the pulse number modulation, a switched-on duration or pulse duration of the current pulses of the pulse number modulation is fixedly predefined and the number of current pulses is set such that the transition takes place as continuously as possible or with as small a jump as possible. A suitable number of current pulses can be determined, for example, with knowledge of a brightness or light energy at the transition point and with knowledge of the light energy generated by a current pulse, by a multiplication of the light energy brought about by the current pulses and the number of current pulses as a variable.

Alternatively, the switched-on duration or pulse duration and the number of current pulses of the pulse number modulation can be determined as a best combination or variation of both variables, if appropriate within predefined limits for at least one of the parameters.

In particular, the number of current pulses of the pulse number modulation per period duration at the transition point is the maximum number of current pulses. The number of current pulses is reduced by further dimming. The maximum number of current pulses thus also corresponds to the number of brightness steps or brightness levels that can be set by the pulse number modulation.

In one configuration, moreover, the method is carried out in parallel for a plurality of groups of light emitting diodes of different colors. Each of the groups can have one or more light emitting diodes of the same color. In this case, in particular, the (mixed) light emitted by the light emitting diodes can have a desired cumulative color locus. On account of the individual adaptation of the type of driving to different operating states, in particular distinguishable by different ranges of the light energy desired value, in particular dimming level, a compliance of the cumulative color locus with low dimming levels can be simplified.

Furthermore, various embodiments provide a lighting device including at least one light emitting diode and at least one driver for feeding the at least one light emitting diode, wherein the lighting device is configured to carry out the method as described above.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1:
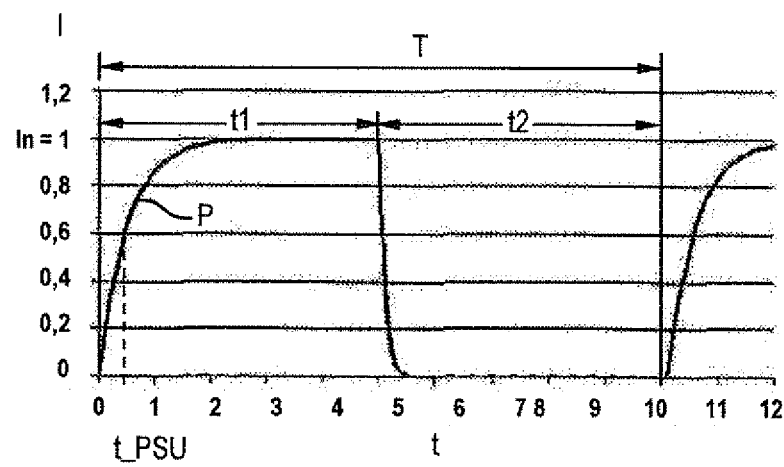
FIG. 1 shows a plot of a pulse-width-modulated current I—normalized to a nominal current—through at least one light emitting diode as a function of a time t in arbitrary time units for a comparatively slow current source.

FIG. 1 shows a plot of a pulse-width-modulated current I—normalized to a nominal current In=1—through one LED or a plurality of LEDs (not illustrated) as a function of a time t in arbitrary time units, namely for a comparatively slow current source. The PWM period or period duration T of a single current pulse P is in this case approximately 10 time units. The period duration T can be, in particular, between 0.5 ms and 10 ms. A switched-on duration t1 of the current pulse P and also a switched-off duration t2 (=T−t1) have a desired value of exactly 5 time units, such that the desired duty ratio t1/T or t1/(t1+t2), corresponding to the desired dimming level, is ideally 50%.

As a result of the non-negligible (rise) time constant t_PSU of the current source of in this case 0.5 time units, however, the actual dimming level is only 46%, which corresponds to a relative error of approximately 8%. As a result of an inertia of the current source, the dimming level thus decreases by approximately 4%.

Figure 2:
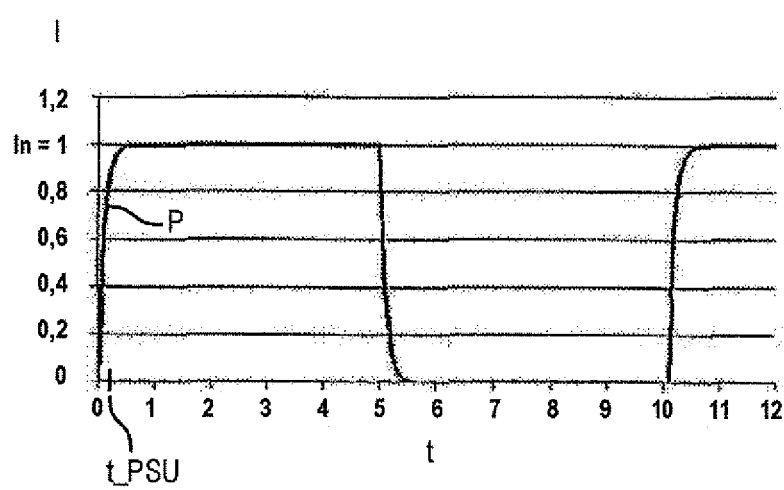
FIG. 2 shows a plot of a pulse-width-modulated current I—normalized to a nominal current—through at least one light emitting diode as a function of a time t in arbitrary time units for a comparatively fast current source.

FIG. 2 shows a plot analogous to FIG. 1 for a comparatively fast current source having t_PSU of approximately 0.1 time units. The relative error with regard to the dimming level is then negligibly small.

Figure 3:
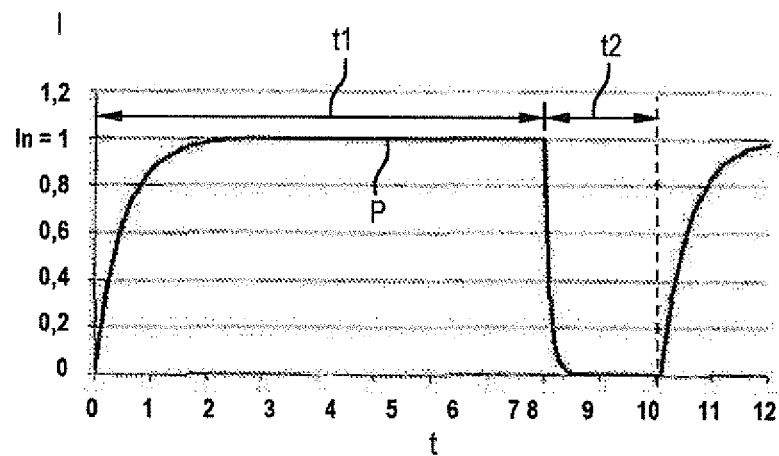
FIG. 3 shows a plot of a pulse-width-modulated current I—normalized to a nominal current—through at least one light emitting diode as a function of a time t in arbitrary time units for the comparatively slow current source with a longer switched-on duration.

FIG. 3 shows a plot analogous to FIG. 1 for the comparatively slow current source, wherein now the desired switched-on duration t1 is eight time units, corresponding to a desired dimming level of 80%. The actual dimming level is only 80%−4%=76%, however, which corresponds to a relative error of approximately 5%.

Figure 4:
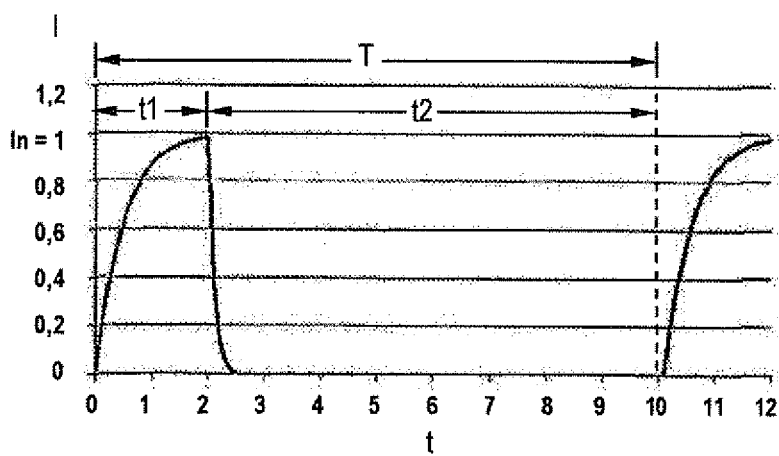
FIG. 4 shows a plot of a pulse-width-modulated current I—normalized to a nominal current—through at least one light emitting diode as a function of a time t in arbitrary time units for the comparatively slow current source with a shorter switched-on duration.

FIG. 4 shows a plot analogous to FIG. 1 for the comparatively slow current source, wherein now the desired switched-on duration t1 is two time units, corresponding to a desired dimming level of 20%. The actual dimming level is only 20%−4%=16%, however, which corresponds to a relative error of approximately 20%.

The reduction of the dimming level by 4%, this reduction being substantially constant for the examples described above, is due to the constant form there of the edges of the current pulse if the nominal current is attained at I=1.

If the dimming level is reduced to below 20%, the nominal current is no longer attained, and the edge becomes steeper. This reduces the absolute error to below 4%, but increases the relative error.

If, by way of example, a switched-on duration t1 of one time unit corresponds to a desired dimming level of 10%, the actual dimming level is 7%, which corresponds to a deviation of 3%, but to a relative error of 30%. Analogously, a switched-on duration t1 of 0.5 or 0.2 time units (desired dimming level 5% or 2%, respectively) corresponds to an actual dimming level of 3% or 1%, respectively. The associated relative error is 40% or 50%, respectively.

Figure 5:
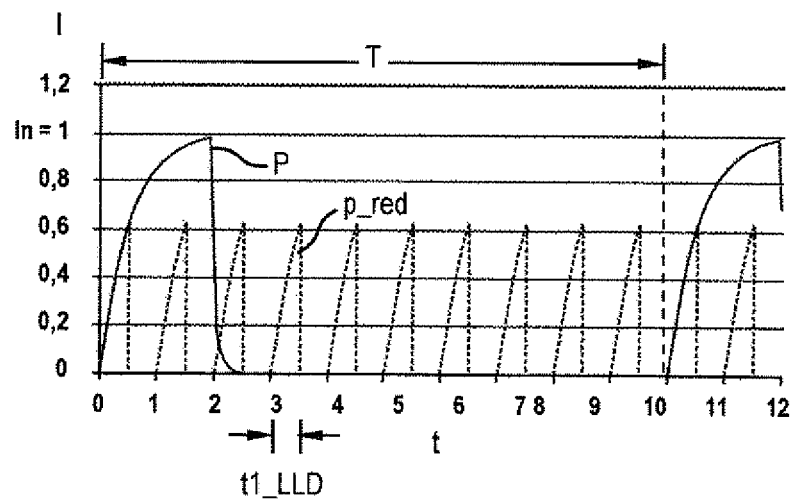
FIG. 5 shows the plot from FIG. 4 with its pulse width modulation together with an alternative pulse number modulation for switched-on durations of the current source above the rise time constant t_PSU.

FIG. 5 shows a plot similar to the plot from FIG. 4 with the conventional type of pulse width modulation as shown there with the individual current pulse P having the parameters: t1_min=1.9 time units (corresponding to a desired dimming level of 19%), an actual dimming level of 15% and a relative error of 21%. t1_min is understood to mean the smallest switched-on duration for an individual current pulse P for which the current pulse still attains the nominal value of the current In=1.

A novel pulse number modulation (PNM) is additionally depicted by dashed lines. The pulse number modulation has, within the original period duration T of 10 time units, a plurality of "reduced" current pulses p_red which do not attain the nominal current In and, as a result, attain an, also relatively, steeper edge. The period duration T of the pulse width modulation corresponds to an interval duration of the pulse number modulation.

A pulse width or switched-on duration t1_LLD and also a number n_dim of the reduced current pulses p_red within the original period duration T are chosen such that at the "transition point" t=t1_min the pulse width modulation and the pulse number modulation have an identical actual dimming level of 15% with an identical relative error of 21%. The behavior, in particular a brightness behavior, of the LED(s) is thus identical at the transition point t1_min, such that a change between the two types of modulation at the transition point t1_min (e.g. PWM for t1>t1_min or for t1>=t1_min and PNM for t1<=t1_min or t1<t1_min) is not perceptible to an observer by way of the brightness.

In the example shown, the same behavior at the transition point t1_min is attained by n_dim=10 reduced current pulses each having a pulse width or switched-on duration t1_LLD=t_PSU and thus a current level I of approximately 0.63 of the nominal current value In.

Figure 6:
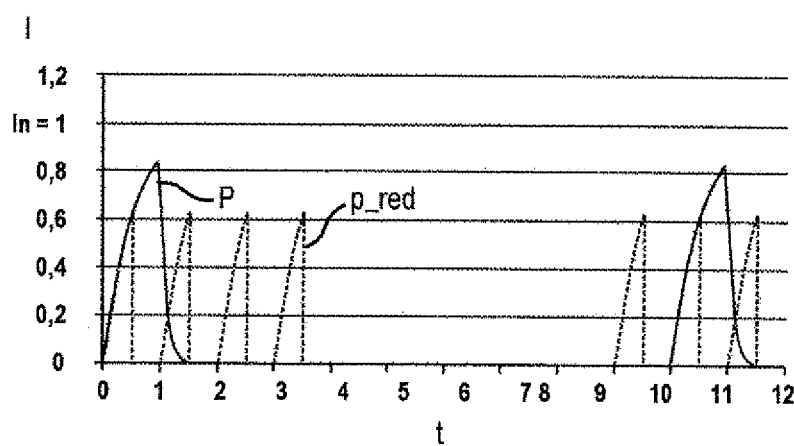
FIG. 6 shows a plot of the pulse width modulation together with the alternative pulse number modulation for switched-on durations of the current source below the rise time constant t_PSU.

If, in particular, the switched-on duration t1 of the individual current pulse P of the pulse width modulation falls below t1_min, that is to say if the dimming level is reduced toward very low dimming levels, the use of the reduced current pulses of the pulse number modulation considerably improves the linearity between the desired dimming level and the actual dimming level. In this respect, FIG. 6 shows a conventional individual PWM current pulse P with a switched-on duration t1=0.95<t1_min=0.5·1.9 time units (corresponding to half of t1_min from FIG. 5), which corresponds to an actual dimming level of 6.2% and a relative error of 35%. The individual current pulse P now attains only approximately 0.85% of the nominal current.

The number, correspondingly reduced to n_dim=0.5·10=5, of reduced current pulses p_red of the pulse number modulation, which in terms of their form are identical to the reduced current pulses p_red shown in FIG. 5 (that is to say are dimming-level-invariant), produce an improved actual dimming level of 7.6% and an improved relative error of 25%. By virtue of the fact that the pulse frequency of the reduced current pulses p_red for n_dim>1 is higher than that of the individual current pulse P in the pulse width modulation, flicker is not perceptible either.

It is also possible to replace the one PWM current pulse P used hitherto by two different numbers n_dim of reduced current pulses p_red. By way of example, an actual dimming level of 2% and a relative error of 50% can be attained with a single PWM current pulse P of t1=0.4 time units (corresponding to a desired dimming level of 4%). An actual dimming level of 3% and a relative error of 25% result when using n_dim=2 reduced current pulses p_red of the form described above. An actual dimming level of 4.5% and a relative error of just 13% result when using n_dim=3 reduced current pulses p_red.

The linearity between the desired dimming level and the actual dimming level or a brightness of the LED(s) can consequently be improved by virtue of the fact that proceeding from a pulse width modulation for t1>approximately t1_min with an individual current pulse P at approximately t1_min switching-over is effected to a pulse number modulation for t1<approximately t1_min, wherein the pulse width modulation in accordance with the second mode, depending on the dimming level, has one or a plurality of reduced current pulses p_red, and vice versa.

Generally, a switched-on duration t1_LLD=t_PSU of the reduced current pulses p_red can be defined by the requirement for a continuous transition of the brightness or light energy at the transition point t1_min and then the desired dimming level can be approximated by the best number n_dim and/or switched-on duration t1_LLD of the reduced current pulses p_red. The quantity of light emitted from the LED or LEDs is in this case proportional to n_dim·t1_LLD.

As can be seen from the examples, the relative error for low dimming levels can be considerably reduced by the use of pulse number modulation. The linearity for low dimming levels can therefore be considerably increased.

A pulse number modulation can be carried out separately for a plurality of LEDs of different types, in particular different-colored LEDs. The LEDs of different types can be driven, in particular, in a synchronized or coordinated manner. In particular, an interval duration can be the same for the LEDs of different types.

The following advantages are achieved, inter alia, by the pulse number modulation:

No flicker is visible even with very low dimming levels (0%<t/T<10%). It is even possible to achieve dimming levels below 1% with a sufficiently accurate linearity.

The time constant t_PSU of the current source can be longer than the PWM switched-on duration t1_LLD necessary for achieving low dimming levels (t1/T<10%, in particular<2%).

Even in the case of a high time constant t_PSU, it is possible to achieve a linear dimming behavior to a dimming level of below 10% (in particular between 1% and 10%), which is advantageous in particular for color mixing control.

Figure 7:
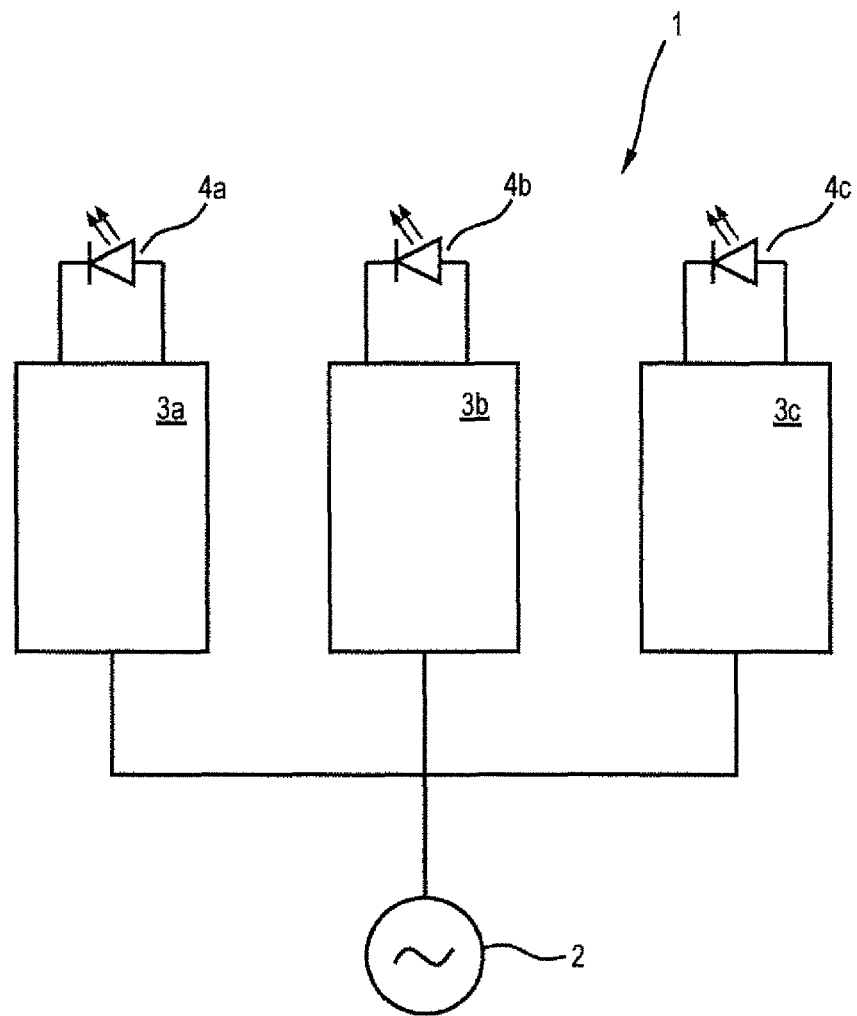
FIG. 7 shows an LED lighting device for carrying out the pulse number modulation.

FIG. 7 shows a possible LED lighting device 1 for carrying out the pulse number modulation and, in particular, the method described above. The LED lighting device 1 has a power supply system connection 2, which here supplies for example three drivers 3a, 3b, 3c with current. The three drivers 3a, 3b, 3c respectively feed a light emitting diode 4a, 4b and 4c, which emit light of different colors, e.g. red, green and blue, respectively. The drivers 3a, 3b, 3c can drive the light emitting diode 4a, 4b and 4c, respectively, assigned to them in each case according to the method described above. The drivers 3a, 3b, 3c can be coordinated with one another such that they drive the light emitting diode 4a, 4b and 4c, respectively, assigned to them such that a desired cumulative color locus of a mixed light generated by the light emitting diodes 4a, 4b and 4c is approximated or set, in particular adjusted.

The lighting device 1 can be e.g. a lamp or a luminaire.

It goes without saying that the present invention is not restricted to the exemplary embodiments shown.

For a particularly effective approximation to the desired dimming level it can be advantageous, for example, that t1_LLD<t_PSU.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

LIST OF REFERENCE SIGNS

1 LED lighting device
2 Power supply system connection
3a Driver
3b Driver
3c Driver
4a Light emitting diode
4b Light emitting diode
4c Light emitting diode
I Current
In Nominal current
T Period duration
P Current pulse
t Time
t1 Switched-on duration
t2 Switched-off duration
t1_min Transition point
t_PSU Rise time constant
p_red Reduced current pulse
n_dim Number of current pulses
t1_LLD Switched-on duration

The invention claimed is:

1. A method for operating at least one light emitting diode, comprising:
   providing a current source characterized by a first rise time corresponding to a first operating current,
   selecting a second operating current,
   determining a second rise time corresponding to said second operating current, and
   applying a number of current pulses to said at least one light emitting diode,
   wherein the duration of said current pulse is fixed according to said second rise time, and
   said number of pulses is modulated according to a desired light energy value,
   wherein the second rise time is a partial fraction of the first rise time.

2. The method as claimed in claim 1, wherein the first operating current is a nominal operating current and the method further comprises switching over to a pulse width modulation at relatively high dimming levels.

3. The method as claimed in claim 2, wherein the switching over is carried out when a dimming level is attained or exceeded which corresponds to a current pulse duration of the pulse width modulation equal to the first rise time.

4. The method as claimed in claim 2, wherein said second rise time is shorter than a period duration of the pulse width modulation.

5. The method as claimed in claim 1, wherein the method comprises switching over to a current level modulation at relatively high dimming levels and to the pulse number modulation at relatively low dimming levels.

6. The method as claimed in claim 1, wherein the duration of at least one said current pulse is less than or equal to said second rise time.

7. The method as claimed in claim 1, wherein the duration of at least one of said at least one current pulse is between approximately 0.1 times and approximately 10 times the said first rise time.

8. The method as claimed in claim 1, wherein the said number of pulses is modulated within a predetermined interval duration and the interval duration is between approximately 1 µs and approximately 10 ms.

9. The method as claimed in claim 2, wherein the switching over is carried out at a switch-over point with a continuous brightness of the at least one light emitting diode.

10. The method as claimed in claim 9, wherein the duration of at least one said current pulse of the pulse number modulation is defined on the basis of said number of pulses which is fixed at the instant of switching over.

11. The method as claimed in claim 1, wherein the method is carried out in parallel for a plurality of groups of light emitting diodes of different colors, wherein the light emitted by the light emitting diodes has a desired cumulative color locus.

12. A lighting device comprising:
   at least one light emitting diode,
   at least one driver configured to feed the at least one light emitting diode and
   a current source for feeding the at least one driver,
   wherein the lighting device is configured to carry out a method for operating the at least one light emitting diode,
   said current source is characterized by a first rise time corresponding to a first operating current and a second rise time corresponding to a second operating current,
   said driver applies a number of current pulses to said at least one light emitting diode and
   fixes the duration of said current pulse according to said second rise time, and
   said driver modulates the said number of pulses according to a desired light energy value,
   wherein the second rise time is a partial fraction of the first rise time.

13. The method as claimed in claim 1, wherein said desired light energy value comprises a particular dimming level.

14. The method as claimed in claim 4, wherein said second rise time is shorter than said period duration of the pulse width modulation by a factor of 0.01 to 0.1.

15. The method as claimed in claim 7, wherein said duration is between 0.3 times and 1.5 times said second rise time.

16. The method as claimed in claim 8, wherein said interval duration is between approximately 0.5 ms and approximately 10 ms.

17. The method as claimed in claim 1, wherein said second operating current is less than said first operating current.

18. The method as claimed in claim 17, wherein said second operating current is less than said first operating current by a factor of 0.5.

19. The method as claimed in claim 17, wherein said second operating current is less than said first operating current by a factor of $(1-1/e)$.

* * * * *